United States Patent [19]
Hartzell et al.

[11] 3,835,978
[45] Sept. 17, 1974

[54] LOG TRANSFER APPARATUS

[75] Inventors: George W. Hartzell; Robert J. Gunnerman, both of Piqua, Ohio

[73] Assignee: Hartzell Industries, Inc., Piqua, Ohio

[22] Filed: Oct. 30, 1972

[21] Appl. No.: 301,992

Related U.S. Application Data

[63] Continuation-in-part of Ser. No. 152,751, June 14, 1971, Pat. No. 3,747,455.

[52] U.S. Cl. .............................. 198/22 R, 214/89
[51] Int. Cl. ........................................... B65g 47/08
[58] Field of Search ......... 198/26, 103, 22 R, 22 B, 198/25, 29; 83/417, 705; 10/107 PH; 214/1 PB, 89, 130 C; 221/266, 277

[56] References Cited
UNITED STATES PATENTS

| 789,724 | 5/1905 | Goffe | 221/266 X |
|---|---|---|---|
| 1,000,347 | 8/1911 | Schmidt | 221/236 |
| 2,024,513 | 12/1935 | Diescher | 198/25 |
| 2,970,706 | 2/1961 | Schrecker | 214/89 |

FOREIGN PATENTS OR APPLICATIONS

| 216,520 | 11/1968 | U.S.S.R. | 198/103 |

Primary Examiner—Edward A. Sroka
Attorney, Agent, or Firm—Jacox & Meckstroth

[57] ABSTRACT

A supply of logs are successively transferred from an endless deck conveyor to a sawmill carriage by a log transfer rotor and log positioning cradles. The rotor includes a shaft supporting a plurality of axially spaced transfer elements each having diametrically opposed recesses for receiving logs. The log positioning cradles are arranged in parallel relation to the rotor and are supported for vertical movement by corresponding fluid cylinders. The log transfer rotor and deck conveyor are independently driven by corresponding motors which are operated in timed relation by an automatic control system.

5 Claims, 6 Drawing Figures

3,835,978

LOG TRANSFER APPARATUS

This application is a continuation-in-part of U.S. Pat. application Ser. No. 152,751, filed June 14, 1971, now U.S. Pat. No. 3,747,455.

BACKGROUND OF THE INVENTION

In the art of sawmill systems or equipment, a supply of logs, generally cut to a predetermined length, are usually loaded onto a horizontal deck conveyor consisting of a set of parallel spaced endless conveyor chains. The deck conveyor transports the logs laterally to a transfer device which successively transfers the logs onto the bed of a carriage supported by tracks for movement past a rotating circular saw. The carriage includes means for gripping each log and for feeding the log longitudinally into the rotating saw. One form of log transfer mechanism is disclosed in U.S. Pat. No. 3,584,726 which issued to the assignee of the present invention. This transfer mechanism includes a series of laterally spaced, pivotally supported transfer elements which are oscillated by fluid cylinders for transferring each log from the deck conveyor to parallel spaced rails which extend to the path of the carriage. Another form of log transfer mechanism which employs oscillatory transfer elements is disclosed in U.S. Pat. No. 3,355,042.

The operation of the log transfer mechanisms or devices disclosed in the above patents, requires a skilled operator to provide for successive transfer of the logs to the sawmill carriage without a substantial loss of time during the transfer operation. That is, after the operator returns the carriage to its position for receiving another log, the transfer elements are actuated so that they pivot and return to positions for receiving the next successive log. The operator then actuates the deck conveyor to transfer a log from the conveyor onto the transfer elements, after which the transfer elements are pivoted in the opposite direction to deposit the log onto the rails which extend to the carriage. These successive operations must be performed quickly by a skilled operator so that the next successive log is loaded onto the carriage without a long delay.

SUMMARY OF THE INVENTION

The present invention is directed to an improved log transfer mechanism which is ideally suited for successively loading logs into a carriage which depends from overhead tracks, such as disclosed in co-pending U.S. Pat. application Ser. No. 152,751, filed June 14, 1971 now U.S. Pat. No. 3,747,455. However, the log transfer apparatus of the present invention may also be used for transferring and loading logs onto other types of carriages such as the carriage disclosed in U.S. Pat. No. 3,600,833 which issued to the assignee of the present invention.

In accordance with the illustrated embodiment of the log transfer and loading apparatus constructed in accordance with the present invention, a log transfer rotor is positioned adjacent the end of the deck conveyor. The rotor consists of a shaft which supports a series of axially spaced generally circular discs each having diametrically opposed arcuate recesses. A set of log receiving cradles are positioned adjacent the log transfer rotor on the opposite side from the deck conveyor, and the cradles are independently supported for vertical movement by corresponding fluid cylinders. Each log is automatically transferred from the deck conveyor to the elevating cradles by simply closing a start switch which actuates a circuit for automatically operating the deck conveyor in response to and in timed relation with rotation of the log transfer rotor through one-half revolution.

Thus, the apparatus of the invention provides for rapid and efficient successive transfers or delivery of a series of logs to a log support carriage which feeds the log axially into a rotating saw or other cutting device. However, other features and advantages of the invention will be apparent from the following description, the accompanying drawings and the appended claims.

DESCRIPTION OF THE PREFERRED EMBODIMENT

Figure 1:
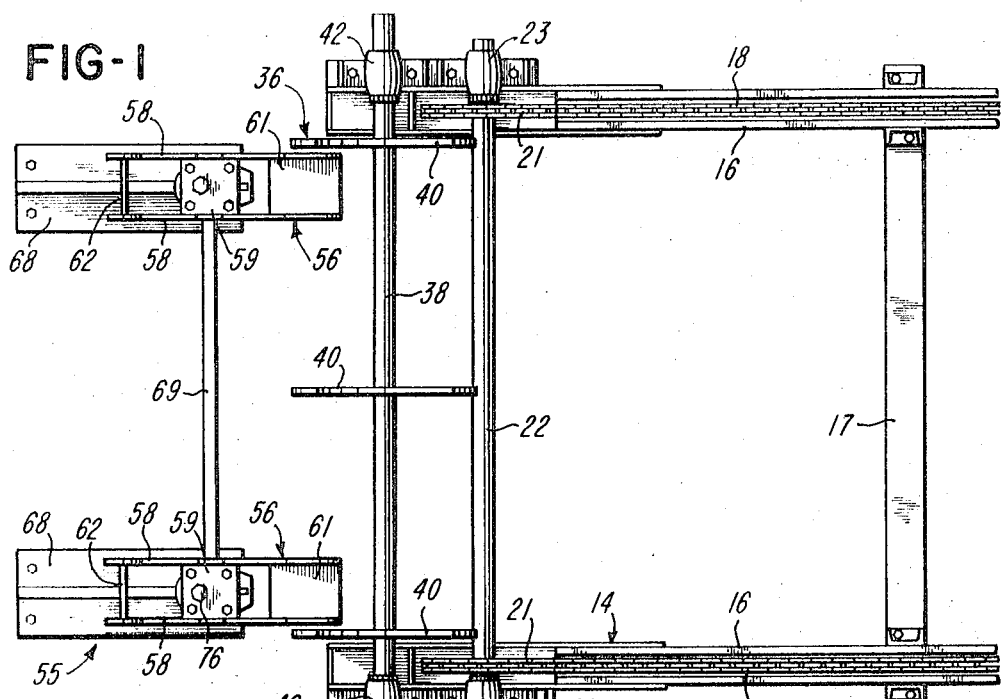
FIG. 1 is a plan view of log transfer and loading apparatus constructed in accordance with the invention.
Figure 2:
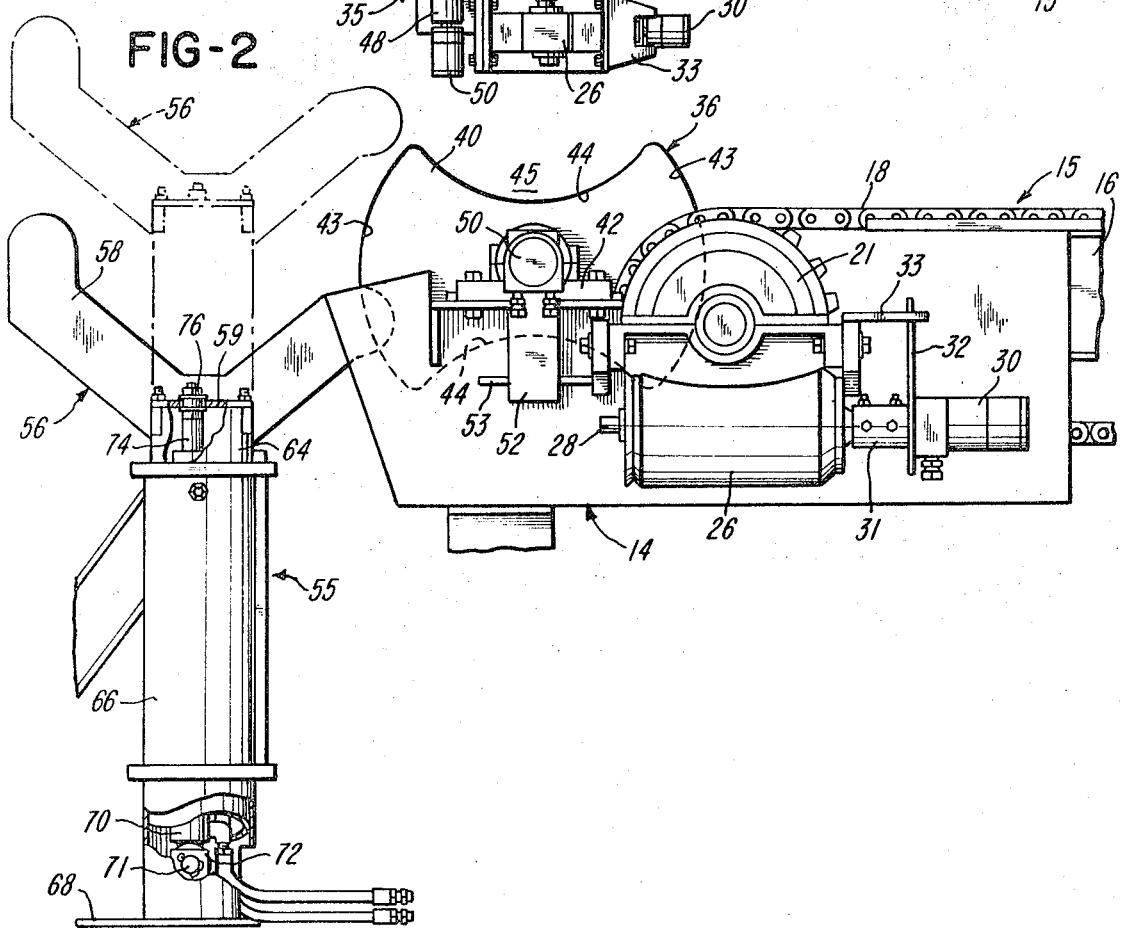
FIG. 2 is an elevational view of the apparatus shown in FIG. 1 and showing in phantom the elevated position of the log positioning cradles.

The apparatus shown in FIGS. 1 and 2 includes a base frame 14 which supports deck conveyor unit 15 consisting of parallel spaced tracks 16 rigidly connected by a plurality of cross frame member 17. Each of the tracks 16 supports the upper run of an endless conveyor chain 18, and the forward ends of the chains 18 are directed around corresponding sprockets 21 mounted on a shaft 22. The shaft 22 is rotatably supported by a pair of bearings 23 mounted on the base support frame 14. The opposite ends of the conveyor chains 18 extend around corresponding sprockets (not shown) which are mounted on a shaft similar to the shaft 22. One end portion of the shaft 22 extends through a gear reducer 26 which is supported by the base frame 14. The gear reducer 26 has an input shaft 28 which is driven by the output shaft of the hydraulic motor 30 through a coupling 31. A torque arm 32 is secured to the motor 30 and engages a bracket 33 to prevent rotation of the motor 30.

Figure 3:
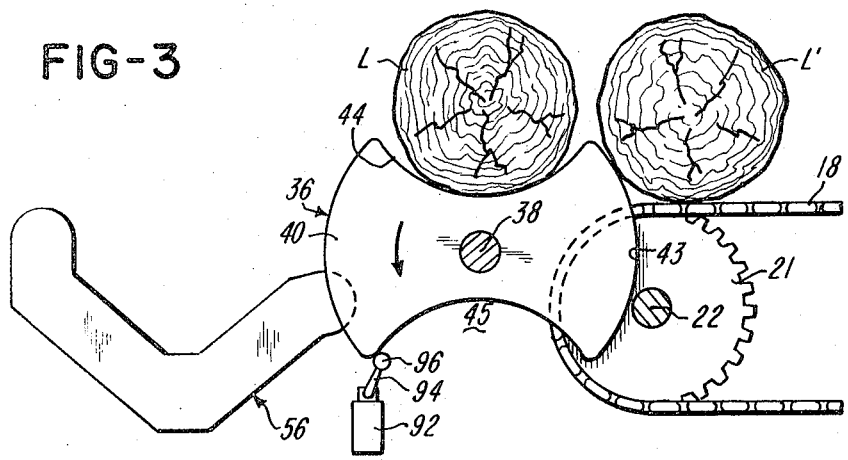
FIGS. 3–5 are somewhat diagrammatic views of the apparatus shown in FIGS. 1 and 2 and illustrating one cycle of operation for transfering a log to the log elevating and loading unit.
Figure 4:
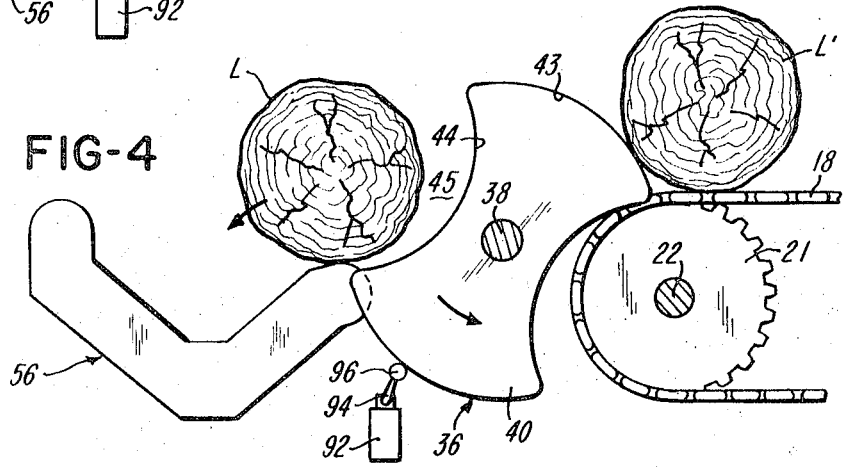
Figure 5:
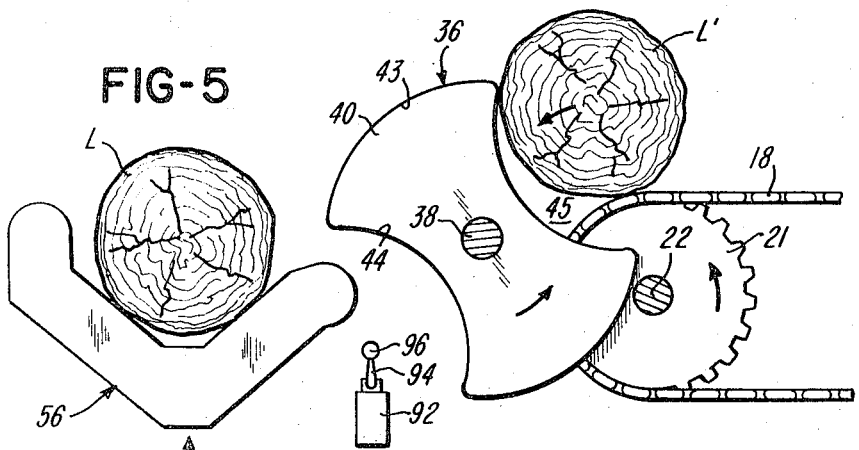

A log transfer unit 35 is located adjacent the inner end of the deck conveyor unit 15 and includes a rotor 36 having a shaft 38 which extends parallel to the shaft 22 of the deck conveyor unit 15. The shaft 38 supports a series of three equally spaced disc-like transfer elements or plates 40 which are rigidly secured to the shaft 22. The rotor 36 is supported for 360° rotation by a set of bearings 42 which are mounted on the base frame 14 and receive corresponding ends of the shaft 38. Each of the transfer elements or plates 40 has diametrically opposed convex circular outer edge surfaces 43 and a pair of diametrically opposed concave circular edge surfaces 44 which define corresponding recesses 45. The transfer plates 40 are positioned on the shaft 38 so that the corresponding recesses 45 are axially aligned and cooperate to receive and support logs, as illustrated in FIGS. 3–5. A coupling 48 connects one end portion of the shaft 38 to the drive shaft of a hydraulic motor 50, and the motor 50 is prevented from rotating by a torque arm 52 which engages a bracket 53 secured to the base frame 14.

A log elevating and positioning unit 55 is positioned adjacent the log transfer unit 35 on the side opposite of the deck conveyor unit 15. The log positioning unit 55 includes a pair of parallel spaced cradle members 56 each having a generally V-shaped configuration formed by parallel spaced side plates 58 connected by a center plate 59 and a set of end plates 61 and 62. Each of the plates 59 is mounted on the upper end of an inner cylindrical tube 64 which is supported for vertical movement by a surrounding outer cylinder tube 66. Each of the outer tubes 66 is rigidly supported in a vertical position by a base frame member 68 adapted to be secured to the floor under the path of the log support carriage. A tie bar 69 rigidly connects the outer cylindrical tubes 66 and cooperates with the frame members 68 to support the outer cylindrical tubes 66 in their vertical positions.

A fluid or hydraulic cylinder 70 is positioned within each of the inner cylindrical tubes 64 and has a lower end portion supported by a pin 71 and bracket 72 secured to the base frame member 68. Each of the hydraulic cylinders 70 includes an upwardly projecting piston rod 74 which is connected to the center cross plate 59 of the corresponding cradle member 56 by a fitting 76. When hydraulic fluid is applied to each of the hydraulic cylinders 70, the corresponding cradle member 56 is elevated so that a log supported by the cradle members is moved upwardly to a position where its center portion is located at a predetermined position for engagement by logs projecting from the log transport carriage. Preferably, the fluid cylinders 70 are independently operated so that the smaller diameter end portion of a log may be elevated to a slightly higher position than the larger diameter end portion of the log to position the centerline of the log substantially in a horizontal plane. If the logs have a substantially uniform diameter, the fluid cylinders may be connected in parallel so that the cradle members 56 operate as a unit.

Figure 6:
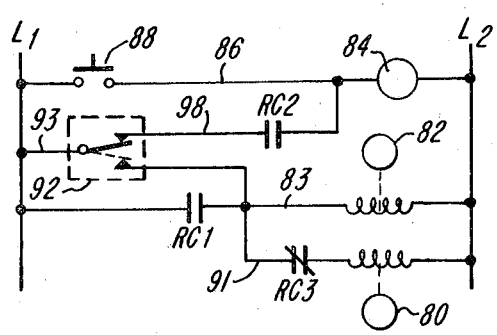
FIG. 6 is a schematic electrical diagram showing the control system for operating the apparatus shown in FIGS. 1 and 2.

Referring to FIG. 6, the supply of hydraulic fluid to the hydraulic motor 30 is controlled by a solenoid actuated valve 80, and the supply of hydraulic fluid to the hydraulic motor 50 is controlled by a solenoid actuated valve 82. The solenoid of the valve 82 is connected by a line or conductor 83 to power supply lines L1 and L2 through a normally opened contact RC1 of a relay 84. The coil of the relay 84 is connected by a line 86 to the power supply lines L1 and L2 through a momentary contact push button switch 88. A line or conductor 91 connects the solenoid of the valve 80 to the power supply line L2 and to the line 83 and one of the contacts of a double pole, single throw switch 92. The switch 92 has a common terminal connected by a line or conductor 93 to the power supply line L2.

As shown in FIGS. 3-5, the switch 92 includes a pivotal actuator arm 94 which carries a roller 96. The switch 92 is located so that the roller 96 is positioned within the path of one of the transfer elements or plates 40 of the rotor 36. A conductor 98 (FIG. 6) connects the other contact of the switch 92 to the conductor 86 through a normally open contact RC2 of the relay 84. The relay 84 also includes a normally closed contact RC3 which is located within the conductor 91 in series with the solenoid of the valve 80.

Referring to FIGS. 3-6, the log transfer and loading apparatus operates in the following manner. The normal position of the rotor 36 is shown in FIG. 3, and the normal state of the electrical control system is shown in FIG. 6. A log L is supported by the rotor 36 within the upper aligned recesses 45 of the transfer elements or plates 40. The next successive log L' is supported by the conveyor chains 80 adjacent the rotor 36, but is prevented from rolling onto the rotor 36 by the adjacent edge surfaces 43 of the rotor plates 40.

When it is desired to transfer the log L to the log elevating and loading unit 55, the push button switch 88 is momentarily depressed. This causes energizing of the coil of the relay 84 so that the contacts RC1 and RC2 close and the contacts RC3 open. The relay 84 remains energized by power supply through the conductors 93 and 98 and the switch 92. The closing of the relay contacts RC1 is effective to actuate the solenoid of valve 82 so that the valve opens and hydraulic fluid is supplied to the hydraulic motor 50 for driving the rotor 36 in a counterclockwise direction (FIGS. 3-5).

The rotor 36 continues to rotate (FIG. 4) so that the log L supported by the rotor is rolled into the cradle members 56. As the rotor 36 continues to rotate, the roller 96 on the switch actuator 94 is released from the adjacent rotor transfer plate 40, and the limit switch 92 shifts to the dotted position (FIG. 6). This actuation of the switch 92 deenergizes the relay 84 so that the solenoid of valve 80 is energized, and hydraulic fluid is supplied to the motor 30 for operating the deck conveyor unit 15. The rotor 36 continues to rotate since the solenoid valve 82 remains energized through the switch 92, and fluid continues to be supplied to the hydraulic motor 40 for the rotor 36.

The simultaneous operation of rotor 36 and the deck conveyor unit 15 is effective to transfer or move the next successive log L' into the adjacent recesses 45 of the rotor 36, as illustrated in FIG. 5. After the rotor completes one-half revolution, the limit switch 92 is again actuated and reset to the position shown in FIG. 6, thereby deenergizing the solenoids of the valves 80 and 82 and completing one cycle of operation.

When the log support carriage of the sawmill is returned to its log receiving position above the log loading unit 55 and is ready to receive another log, the hydraulic cylinders 70 are actuated so that the log supported by the cradle members 56 is elevated to a position where the geometric centerline of the log is located at substantially the centerline of the carriage. The ends of the log are then engaged by dogs on the carriage, and the cradle members 56 are retracted downwardly to their home position by actuation of the hydraulic cylinders 70. When it is desired to transfer the next successive log onto the cradle members 56, the push button switch 88 is momentarily closed, and the cycle is repeated.

From the drawings and the above description, it is apparent that a log transfer unit constructed in accordance with the present invention, provides desirable features and advantages. One important advantage is that the apparatus provides for rapid and efficient successive transfer of a supply of logs. The apparatus is also effective to operate automatically after a cycle is initiated by momentarily depressing the push button switch 88. Thus after a log is transferred to the carriage of the sawmill, and the cradle members 56 retract downwardly to their normal positions, the operator of the sawmill only needs to depress the switch 88 to effect transfer of the next log onto the cradle members 56. As a result, the operator is free to concentrate upon the movement of the carriage and the feeding of the log supported by the carriage into the rotating saws or other moving log cutting elements. The apparatus is also simple, durable and economical in construction and is adapted to handle logs of varying sizes. Furthermore, the rotor 36 of the log transfer unit 35 is not only effective to receive and automatically transfer each log, but is also effective to hold the next successive log in an adjacent position as illustrated in FIG. 3.

While the form of log transfer apparatus herein described constitutes a preferred embodiment of the invention, it is to be understood that the invention is not limited to the precise form of apparatus described, and that changes may be made therein without departing from the scope and spirit of the invention as defined in the appended claims.

The invention having thus been described, the following is claimed:

1. Apparatus adapted for efficiently transferring a supply of logs in a successive manner to a sawmill carriage movable along a linear path, comprising an endless conveyor for receiving a supply of logs, means for driving said conveyor to deliver each log laterally towards the path of the carriage, a log transfer rotor supported for rotation adjacent said conveyor on an axis extending substantially parallel to the path of the carriage, said log transfer rotor including means for receiving each log from said conveyor, drive means for rotating said transfer rotor, a set of spaced cradle members supported adjacent said log transfer rotor for vertical movement and arranged to receive corresponding end portions of each log from said transfer rotor, and means for moving at least one of said cradle members substantially vertically relative to the other said cradle member while said rotor is receiving the next successive log for quickly positioning the axis of each log relative to the path of the carriage.

2. Apparatus as defined in claim 1 including a fluid cylinder for each of said cradle members and disposed to move the corresponding said cradle member in a substantially vertical direction.

3. Apparatus adapted for efficiently transferring a supply of logs in a successive manner to a sawmill carriage movable along a linear path, comprising an endless conveyor for receiving a supply of logs, means for driving said conveyor to deliver each log laterally towards the path of the carriage, a log transfer rotor supported for rotation adjacent said conveyor on an axis extending substantially parallel to the path of the carriage, said log transfer rotor including means for receiving each log from said conveyor, drive means for rotating said transfer rotor and including a fluid motor, a set of spaced cradle members supported adjacent said log transfer rotor for vertical movement and arranged to receive corresponding end portions of each log from said transfer rotor, means for moving at least one of said cradle members substantially vertically relative to the other said cradle member while said rotor is receiving the next successive log for quickly positioning the axis of each log relative to the path of the carriage, control means including an electrically actuated valve in the fluid supply line to said motor, and switch means actuated by rotation of said rotor to effect actuation of said valve.

4. Apparatus adapted for efficiently transferring a supply of logs in successive manner to a sawmill carriage movable along a linear path, comprising an endless conveyor for receiving a supply of logs, means for driving said conveyor to deliver each log laterally towards the path of the carriage, a log transfer rotor supported for rotation adjacent said conveyor on an axis extending substantially parallel to the path of the carriage, said log transfer rotor including a shaft supporting a plurality of axially spaced transfer discs each defining a pair of diametrically opposed recesses disposed angularly at 90° relative to a pair of diametrically opposed part-circular outer surfaces connecting said recesses, said recesses being adapted to receive the logs from said conveyor, drive means for rotating said transfer rotor, a set of spaced cradle members supported adjacent said log transfer rotor for vertical movement and arranged to receive corresponding end portions of each log from said transfer rotor, and means for moving at least one of said cradle members substantially vertically relative to the other said cradle member while said rotor is receiving the next successive log for quickly positioning the axis of each log relative to the path of the carriage.

5. Apparatus adapted for efficiently transferring a supply of logs in a successive manner to a sawmill carriage movable along a linear path, comprising an endless conveyor for receiving a supply of logs, means for driving said conveyor to deliver each log laterally towards the path of the carriage and including a first motor, a log transfer rotor supported for rotation adjacent said conveyor on an axis extending substantially parallel to the path of the carriage, said log transfer rotor including means for receiving each log from said conveyor, drive means for rotating said transfer rotor and including a second motor, a set of spaced cradle members supported adjacent said log transfer rotor for vertical movement and arranged to receive corresponding end portions of each log from said transfer rotor, means for moving at least one of said cradle members substantially vertically relative to the other said cradle member while said rotor is receiving the next successive log for quickly positioning the axis of each log relative to the path of the carriage, and control means for operating said first motor in response to rotation of said rotor.

* * * * *